United States Patent [19]

Harney et al.

[11] Patent Number: 5,505,901
[45] Date of Patent: Apr. 9, 1996

[54] CATV PAY PER VIEW INTERDICTION SYSTEM METHOD AND APPARATUS

[75] Inventors: Michael P. Harney, Atlanta; Himanshu R. Parikh, Lawrenceville; Lamar E. West, Jr., Maysville; James O. Farmer, Lilburn; Mark E. Schutte, Sugar Hill, all of Ga.

[73] Assignee: Scientific-Atlanta, Inc., Norcross, Ga.

[21] Appl. No.: 218,037

[22] Filed: Mar. 25, 1994

Related U.S. Application Data

[63] Continuation of Ser. No. 618,745, Nov. 27, 1990, abandoned, and a continuation-in-part of Ser. No. 612,933, Sep. 13, 1990, Pat. No. 5,319,454, and a continuation-in-part of Ser. No. 503,423, Apr. 2, 1990, Pat. No. 5,045,816, which is a continuation of Ser. No. 498,083, Mar. 10, 1990, Pat. No. 5,235,619, and Ser. No. 498,084, Mar. 10, 1990, Pat. No. 5,155,590, said Ser. No. 618,745, is a continuation-in-part of Ser. No. 446,695, Dec. 6, 1989, Pat. No. 5,109,286, which is a continuation-in-part of Ser. No. 166,302, Mar. 10, 1988, Pat. No. 4,912,760, and a continuation-in-part of Ser. No. 279,619, Dec. 5, 1988, Pat. No. 5,014,309, which is a continuation-in-part of Ser. No. 166,302.

[51] Int. Cl.[6] .................................................. H04N 7/10
[52] U.S. Cl. .................... 348/10; 348/12; 455/1; 455/5.1
[58] Field of Search ................. 455/3.3, 4.1, 4.2, 455/5.1, 6.1, 6.2, 1; 380/20, 7, 10; 370/85.8; 348/3, 4, 7, 10, 12; 371/8.1, 2.1, 12

[56] References Cited

U.S. PATENT DOCUMENTS

| Re. 29,997 | 5/1979 | den Toonder | 358/112 |
|---|---|---|---|
| Re. 31,639 | 7/1984 | Nicholson . | |
| 3,755,737 | 8/1973 | Eller . | |
| 3,760,097 | 9/1973 | Burroughs et al. . | |
| 3,886,454 | 5/1975 | Oakley . | |
| 3,896,262 | 7/1975 | Hudspeth et al. . | |
| 3,899,633 | 8/1975 | Sorenson et al. . | |
| 3,989,887 | 11/1976 | Murphy . | |
| 4,039,954 | 8/1977 | den Toonder . | |
| 4,085,422 | 4/1978 | Niwata et al. . | |
| 4,245,245 | 1/1981 | Matsumoto et al. . | |
| 4,317,213 | 2/1982 | DiLorenzo . | |
| 4,326,289 | 4/1982 | Dickinson . | |
| 4,343,042 | 8/1982 | Schrock et al. . | |
| 4,358,672 | 11/1982 | Hyatt et al. . | |

(List continued on next page.)

FOREIGN PATENT DOCUMENTS

| 59-61384 | 4/1984 | Japan . |
|---|---|---|
| 91/08651 | 6/1991 | WIPO . |
| 91/08650 | 6/1991 | WIPO . |

OTHER PUBLICATIONS

"TGT—The Affordable Solution", AM Cable TV Industries, Inc.
"Addressable Tap IT-1-SM", Control Com Inc.
The "Tier Guard" System, E-Com Corporation.

*Primary Examiner*—Reinhard J. Eisenzopf
*Assistant Examiner*—Lisa Charouel
*Attorney, Agent, or Firm*—Banner & Allegretti, Ltd.

[57] ABSTRACT

Off-premises cable television pay per view apparatus is coupled between first and second diplexers of off-premises subscriber service providing equipment. The diplexers separate the transmission path between a headend and a subscriber into downstream or forward and upstream or reverse transmission paths. A radio frequency transmitter is coupled between a controller and the upstream diplexer which may actuate a selected one of a plurality of data channels in the notoriously noisy subsplit 5–30 megahertz transmission spectrum for reporting billable events. On-premises equipment is minimized to comprise only a unidirectional data transmitter. The data transmission is sent repetitively over a predetermined period of time before the data transmitter, comprising a microprocessor, turns itself off to conserve power. Thus, data transmitted from the subscriber in a first format is received at off-premises equipment, service is authorized there if appropriate, and then data is transmitted over a data channel selected so as to avoid noisy portions of the spectrum in a second format to a headend.

20 Claims, 6 Drawing Sheets

U.S. PATENT DOCUMENTS

| | | |
|---|---|---|
| 4,367,557 | 1/1983 | Stern et al. . |
| 4,434,436 | 2/1984 | Kleykamp et al. . |
| 4,450,477 | 5/1984 | Lovett ........................................ 358/86 |
| 4,450,481 | 5/1984 | Dickinson . |
| 4,461,032 | 7/1984 | Skerlos . |
| 4,494,138 | 1/1985 | Shimp ........................................ 358/86 |
| 4,521,809 | 6/1985 | Bingham et al. . |
| 4,550,341 | 10/1985 | Naito . |
| 4,651,204 | 3/1987 | Uemura . |
| 4,673,976 | 6/1987 | Wreford-Howard . |
| 4,684,980 | 8/1987 | Rast et al. . |
| 4,685,131 | 8/1987 | Horne . |
| 4,686,564 | 8/1987 | Masuko et al. . |
| 4,692,919 | 9/1987 | West ........................................ 370/85.8 |
| 4,710,955 | 12/1987 | Kauffman . |
| 4,710,956 | 12/1987 | Rast . |
| 4,716,588 | 12/1987 | Thompson et al. . |
| 4,737,990 | 4/1988 | Kaneko . |
| 4,739,510 | 4/1988 | Jeffers et al. . |
| 4,754,426 | 6/1988 | Rast et al. . |
| 4,769,838 | 9/1988 | Hasegawa ........................................ 455/1 |
| 4,771,458 | 9/1988 | Citta et al. . |
| 4,792,971 | 12/1988 | Uemura . |
| 4,792,972 | 12/1988 | Cook, Jr. ........................................ 380/20 |
| 4,825,468 | 4/1989 | Ellis . |
| 4,837,820 | 6/1989 | Bellavia, Jr. . |
| 4,841,569 | 6/1989 | Wachob . |
| 4,864,614 | 9/1989 | Crowther . |
| 4,912,760 | 3/1990 | West, Jr. et al. . |
| 4,963,966 | 10/1990 | Harney et al. ........................................ 358/86 |
| 5,109,286 | 4/1992 | West, Jr. et al. ........................................ 358/85 |

CATV PAY PER VIEW INTERDICTION SYSTEM METHOD AND APPARATUS

CROSS-REFERENCE TO RELATED APPLICATIONS

This application is a continuation of Ser. No. 07/618,745 filed Nov. 27, 1990 now abandoned which is a continuation-in-part of Ser. No. 446,695, filed Dec. 6, 1989, U.S. Pat. No. 5,109,286, which is a continuation-in-part of both Ser. No. 166,302, filed Mar. 10, 1988, U.S. Pat. No. 4,912,760 and Ser. No. 279,619, filed Dec. 5, 1988, U.S. Pat. No. 5,014,309; which in turn is a continuation-in-part of Ser. No. 166,302, filed Mar. 10, 1988, U.S. Pat. No. 4,912,760; a continuation-in-part of Ser. No. 503,423, filed Apr. 2, 1990, U.S. Pat. No. 5,045,816, which is a continuation of both Ser. No. 498,083, filed Mar. 10, 1990 now U.S. Pat. No. 5,235,619, and Ser. No. 498,084, filed Mar. 10, 1990 now U.S. Pat. No. 5,155,590; and a continuation-in-part of Ser. No. 612,933, filed Sep. 13, 1990 now U.S. Pat. No. 5,319,454. In addition, this application is related by subject matter to U.S. patent application Ser. No. 625,901 now U.S. Pat. No. 5,245,420 entitled "CATV Pay Per View Interdiction System" filed concurrently herewith.

BACKGROUND OF THE INVENTION

1. Technical Field

This invention relates generally to the field of cable television systems and, more particularly, to method and apparatus for providing a reverse radio frequency transmission path from a CATV subscriber to a headend for reporting pay per view and other transactions in a CATV interdiction system.

2. Description of the Relevant Art

The cable television industry has recently resorted to look for new technology and to take a second look at technology developed in the early stages of development of cable television including negative and positive trap technology and interdiction systems to remove equipment off the subscriber's premises. The Scientific Atlanta CATV interdiction system, described by U.S. Pat. No. 4,912,760, evidences one product manufacturer's response to such concerns. Precipitating the removal of equipment from the subscribers' premises has been the provision of television channel conversion equipment within the new television receivers sold today and the predominance of so-called cable ready receivers. In other words, the converter portions of converter/decoders are in many instances no longer required. Also, removal of equipment from the subscribers' premises accomplishes a removal of equipment from the hands of pirates. The interdiction system described by U.S. Pat. No. 4,912,760 promotes the removal of all CATV equipment from a CATV service subscriber's premise except for equipment for certain special service applications such as pay per view services.

Most embodiments promoted by manufacturers of interdiction systems consist of a pole-mounted or side of building mounted enclosures located outside the subscriber's premises designed to serve four or more subscribers. This enclosure contains at least one microprocessor controlled oscillator and switch control electronics to secure several television channels. Control is accomplished by injecting an interfering or jamming signal into unauthorized channels from this enclosure.

In the Scientific Atlanta system to improve efficiency and to save costs, each of a plurality of oscillators may be used to jam several premium television channels in a continuous band of frequencies selected from the broadband 50–550 MHz spectrum. This technique not only reduces the amount of hardware required, but also maximizes the system flexibility. The oscillator output jamming signal frequency is periodically moved from channel to channel. Consequently, the oscillator is frequency agile and hops from jamming one premium channel frequency to the next.

Cost reduction is achieved in the systems discussed above, i.e. trap and interdiction systems, by providing shared housings outside the subscribers' premises for each of a plurality of subscriber units, for example, four such units and common circuitry associated with the several subscriber units. For example, common control circuitry is shown in FIG. 2 of U.S. Pat. No. 4,912,760. These housings are mounted out-of-doors on poles or in pedestals for serving especially suburban subscribers. Further details of such housing apparatus is also provided by U.S. Pat. No. 4,963,966. Also, indoor housings are known from so-called multiple dwelling unit systems where a cable television system supplies service to apartment buildings or condominium complexes.

In more suburban and rural environs, a single port (subscriber) unit may be provided which may, for example, be mounted to the side of an exterior of a subscriber's home.

In most if not all of these systems, however, situations arise when it is appropriate to provide a return or reverse path from a particular subscriber to a headend. The need for a reverse path has been recognized since the 1970's. Then, it was envisioned that a number of special services could be realized over a cable television distribution plant if a reverse path is provided. The services included remote utility meter reading, fire and burglar alarm, energy management, home shopping, subscriber polling or voting, educational and pay-per-view television services. However, in the 1970's and 1980's the preponderance, if not most, subscriber service providing equipment was physically located on the subscriber's premises. Consequently, there was no attention paid to a problem today of providing reverse path transmission in an off-premises subscriber equipment environment, such as exists in a CATV interdiction system.

One advance in the art of reverse path transmission from the early days of design of two way addressable cable television systems was the two way distribution amplifier. An arrangement is provided for splitting the cable television spectrum into forward and reverse frequency bands. According to a so-called sub-split distribution plant, the frequency band of 54–550 megahertz is reserved for forward, downstream transmission from the headend to the subscriber and the band from 5–30 megahertz is reserved for reverse or upstream transmission. Included in the typical distribution amplifier are diplex filters or diplexers which provide separate paths for the forward and reverse directions on one side and a path for a combined frequency spectrum on the other side.

Typically, a subscriber decoder/converter is provided with a keyboard or other data entry means through which device a subscriber may enter, for example, a home shopping selection or a pay-per-view service request. For remote meter reading, alarm, and energy management services, sensing, measurement, energy control and other devices are appropriately dispersed in a subscriber's premises. Access to the cable distribution plant is provided by a data transmission modem for both subscriber service request data, entered via the keyboard, and utility or alarm data. The data is typically transmitted as frequency shift keyed or phase shift keyed data modulated on a carrier in the 5–30 megahertz band.

As an alternative to FSK or PSK data transmission, spread spectrum techniques and alternative arrangements such as telephone return have also been proposed in cable television systems primarily because of the notorious susceptibility of the 0–30 megahertz band to noise and other interferences. In U.S. Pat. Nos. 5,109,286, 5,155,590, and 5,045,816 and U.S. patent application Ser. No. 07/612,933, filed Nov. 13, 1990, the problem of providing a reverse path data transmission system was generally described in view of the several concurrent problems which still require solution. The problems which remain unsolved include: to minimize the sophistication of subscriber premise equipment, if any, for special service applications, to effectively control off-premise service providing equipment, and to return data to the headend in a noisy, interference prone environment, the 0–30 MHz transmission band.

While arrangements as mentioned above are known for providing on-premises equipment for transmitting data over a reverse path to a headend, there remains a requirement for off-premises reverse path equipment, responsive to a minimum of on-premises equipment, for controlling off-premises service providing system equipment such as descrambling or decoding, trap or interdiction system equipment. Furthermore, there remains a requirement in the art of design of cable television equipment for off-premises reverse path equipment responsive to, and which may be shared in common by, a plurality of subscribers and thus provide a cost-effective efficient arrangement. Also, there exists a requirement in the art for off-premises reverse path equipment to provide a bi-directional transmission path to each subscriber and a bi-directional data transmission path toward the headend (relying on existing in-band or out-of-band downstream data transmission).

SUMMARY OF THE INVENTION

It is an object of the present invention to provide efficient, cost-effective off-premises cable television reverse path equipment for providing a reverse, upstream transmission path from a subscriber to a headend of a cable television system for reporting, for example, pay per view transactions.

It is a further object of the present invention to provide an off-premises cable television reverse path signal combining system for combining a plurality of reverse path signals for temporary storage at the system apparatus for service authorization and for subsequent transmission to a cable television system headend.

It is a further object of the present invention to provide off-premises cable television reverse path equipment, responsive to on-premises subscriber equipment for controlling off-premises cable television service providing equipment.

It is a further object of the present invention to provide off-premises cable television reverse path equipment providing bi-directional transmission to on-premises subscriber equipment and bi-directional data transmission toward a cable television head end, with only unidirectional data transmission from the on-premises equipment being received at the off-premises interdiction apparatus.

In accordance with achieving the objects of the present invention, it is a principle thereof to provide off-premises reverse path equipment at the location of off-premises cable television service providing equipment. By off-premises is intended an equipment site off the premises of a subscriber, for example, on a pole, in a pedestal, in an equipment closet of a multiple dwelling unit, or in equipment attached to the side of a house. In particular, at locations where any such cable television service providing equipment serves one or a plurality of subscribers, the reverse path equipment operates as a signal combiner for combining a plurality of upstream or reverse path communications from the one or the plurality of subscribers for transmission toward the headend.

In one embodiment implemented in an off-premises interdiction system as first suggested in U.S. Pat. No. 4,912,760, a first pay-per view or other special service unit may be provided in the subscriber premises including a pair of filters for separating forward and reverse transmission paths. A second special service unit is provided with common circuitry and includes a signal combiner for combining reverse path signals from a plurality of subscribers for transmission toward the headend. In the event, signals could not be combined and forwarded, a data transmitter was to be provided at the common circuitry for coordinating data transmission to the headend. Alternatively, a return telephone path was suggested. Correspondence was suggested between the special service module at the subscriber premises and the special service module of the common circuitry. Also, it was suggested that power could be provided up the drop to the common circuitry for powering the common circuitry and special service module.

Altogether then, three embodiments were suggested in U.S. Pat. No. 4,912,760 of which only the third embodiment is discussed in detail in accordance with the present invention: a first embodiment for simply combining signals at the common circuitry from a plurality of subscribers, a second embodiment in which return path transmission is provided over telephone lines, and a third embodiment in which a second data transmitter is provided with off-premises equipment in addition to one provided in the subscriber equipment. The three embodiments were first described in some detail in U.S. Pat. No. 5,109,286.

In accordance with the present invention, a radio frequency data return path is provided. Data transmission between the subscriber and the off-premises common and subscriber equipment is provided for a number of reasons. For example, for impulse pay-per-view services, the subscriber requests service through on premises subscriber equipment. The request is transmitted on the subscriber drop to the off-premises subscriber module, impulse pay per view (special service) module, and common circuitry. A microprocessor of the common circuitry determines if the subscriber has credit and immediately authorizes reception. When the pay per view event is broadcast over a particular channel, the common circuitry assures that the channel is transmitted clear of any jamming signal. Meanwhile, a radio frequency return path from the off-premises interdiction equipment to the headend is utilized to transmit program and billing information to the headend according to store and forward techniques known in the art. In this embodiment, an immediate return of data to the headend is not required for service. If the subscriber orders service during a program, the subscriber will be able to immediately view the program.

Under subscriber control, for example, an approximately five megahertz amplitude shift keyed data signal is transmitted by the subscriber to the off-premises interdiction system circuitry, indicating a buy signal for a particular pay-per-view event. A data receiver of the off-premises circuitry receives and decodes the transmission, providing the data to a processor of the pay-per-view (or special service) module. The data processor of the pay-per-view module communicates with a processor of common circuitry which, if appropriate, authorizes reception of the event for that subscriber. The data transmission for reporting the transaction to the headend may be Miller encoded binary phase shift keyed data transmitted at one of a plurality of possible carrier frequencies, preferably selected from within the so-called T8 band or from 15.45–17.75 megahertz. The selection of a particular one of the plurality of predetermined channels may be controlled by the headend to assure data reception at the headend in the presence of noise as is taught in U.S. Pat. No. 5,045,816 (which describes a gain and frequency controlled BPSK modulator) and U.S. Pat. No. 5,155,590 (which describes headend equipment for controlling and processing the radio frequency return data signals). Furthermore, the signal level of the transmitted data signal may be controlled from the headend as taught by these same application.

In accordance with the present invention, on-premises equipment is minimized to comprise only a one way data transmitter, for example, for the purpose of indicating the purchase of a pay-per-view event. Since the subscriber will not receive immediate feedback that his purchase was successful, the buy message is transmitted periodically over a long period of time. Furthermore, the unit is battery-powered and conserves power by turning itself on and off. These same principles are applicable to other special services such as burglar alarm reporting and utility meter reading. In burglar alarm reporting, for example, it is especially important that any on premises equipment be battery-powered in the event the burglar turns off power to the premises before seeking entry.

These advantages and features of the present invention, a system for providing data communication with off-premises service providing subscriber and common circuit equipment and a radio frequency return data transmission path to a headend will be discussed in the following detailed description of the present invention with reference to the drawings.

DETAILED DESCRIPTION OF THE INVENTION

Now the reverse path data transmission system of the present invention will be discussed in the context of the off-premises cable television channel interdiction apparatus first disclosed in U.S. Pat. No. 4,912,760, the disclosure of which is herein incorporated by reference in respect to those features not described by the present specification. On the other hand, the present invention is in principle not limited to reverse path data transmission apparatus for an interdiction system but is also applicable to such apparatus provided generally in any off-premises service providing system, for example, positive and negative trap systems, synch suppression systems and in any other system in which service is provided to a plurality of subscriber units from an off-premises site.

A detailed discussion of the interdiction system in which the present invention may be implemented is also provided in U.S. Pat. No. 4,963,966, also incorporated herein by reference as to essential subject matter. Furthermore, U.S. Pat. No. 5,109,286, U.S. Pat. No. 5,155,590, U.S. Pat. No. 5,045,816, U.S. patent application Ser. No. 612,933 and U.S. patent application Ser. No. 625,901 also incorporated herein by reference, disclose details of radio frequency data return and on- and off-premises apparatus related by subject matter to the present invention. Topics related to interdiction systems such as jamming signal gain and frequency control will not be addressed in great detail herein.

Figure 1:
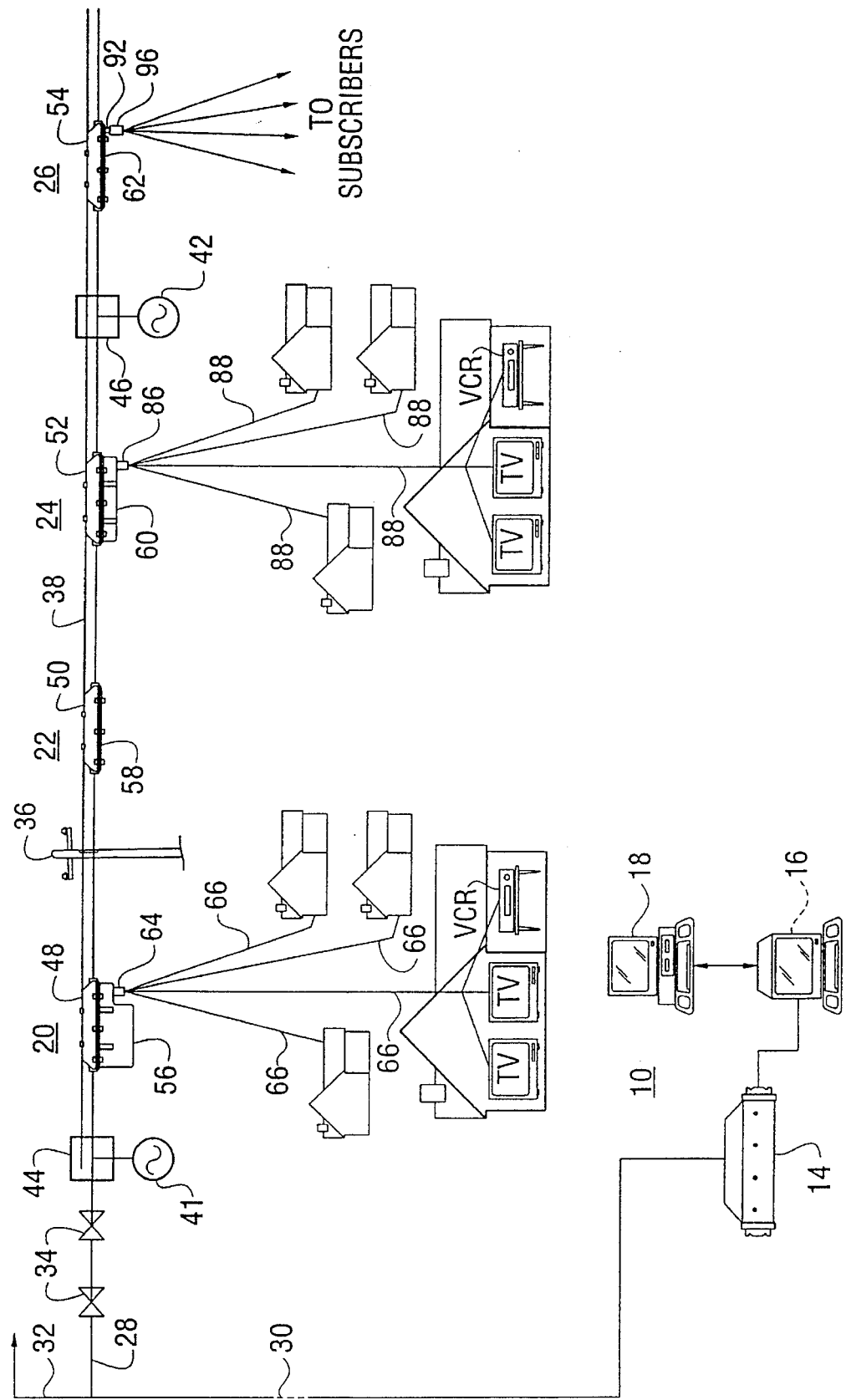
FIG. 1 is an overall system block diagram of a typical two way cable distribution plant showing an off- or on-premises cable television system including two way distribution amplifiers 34 in which system the present off-premises CATV pay per view system may be implemented, i.e. an interdiction cable television system.

Referring more particularly to FIG. 1, there is shown a general block diagram of a cable television system employing the principles of the present invention. By cable television system is intended all systems involving the transmission of television signals over a transmission medium (fiber optic cable or coaxial cable) toward remote locations. For example, a cable television system may comprise a community antenna television distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, single subscribers having plural television receivers or private locations in a private cable distribution network. Consequently, the term subscriber, when used in this application and the claims, refers to either a private subscriber or a commercial user of the cable television system. Headend 10 as used in the present application and claims is defined as the connecting point to a serving cable or trunk 28 for distributing television channels over feeder lines to drops 66, 88 and finally to subscriber locations. For reference purposes, an Electronic Industries Association (E.I.A.) standard cable television frequency allocation scheme is employed and referred to herein; however, by means of the following disclosure of the present invention, one may apply the principles to other known standards or non-standard frequency allocations. Furthermore, a National Television Subcommittee (N.T.S.C.) standard composite television signal at baseband is generally considered in the following description; however, the principles of the present invention apply equally to other standard and non-standard baseband standard definition and proposed high definition television signal formats. Furthermore, the principles of the present invention may not be solely applicable to television services furnished from a headend but may include utility meter reading, burglar alarm reporting, digital or other stereophonic audio delivery systems, video or telephonic services and the like.

Headend 10 typically comprises a source of television programming (not shown). The television program source may be a satellite television receiver output, a program produced by a television studio, program material received over a microwave or broadcast television link, a cable television link output, or any other source of television programming consistent with the present invention. The program source material need not be limited to conventional television but may comprise teletext, videotext, program audio, utility data, or other forms of communication to be delivered to a remote location over the serving cable or trunk line 28 and subsequently over feeder lines and, then, drop lines 66,88. Addressing to provide different levels of service and proper billing are obtained via a computer system manager 16 and a billing computer 18 respectively.

Conventionally, trunk line 28, feeder lines, and drop lines 66,88 are constructed of coaxial cable. For higher performance, any one of these lines could be a fiber optic cable. Preferably, due to the cost of the installation and the need for a high quality initial transmission from headend 10, trunk line 28 is typically the only line constructed of fiber optic cable.

Program material provided by the source may be premium or otherwise restricted or desirably secured from receipt at unauthorized receiver locations. It may be provided over any channel of the 50–550 MHz (or larger band) cable television spectrum. To this end, each channel or program to be secured is generally scrambled by a scrambler provided at headend 10. By the use of the term premium channel or premium programming in the present application and claims is intended a channel or program which is desired to be secured from unauthorized receipt either because of its premium or restricted status.

Normally, all premium programming in known cable television systems is scrambled. However, in accordance with interdiction system technology, premium programming is transmitted in the clear, and interdiction is applied at off-premises interdiction or other off-premises apparatus 20 housed in housing 56 to jam reception of unauthorized premium programming. For example, off-premises apparatus 24 of housing 60 may be coupled to subscribers having on-premises converter/decoders or decoders and off premises apparatus housing 58 may be utilized for coupling to new subscribers to the system. The present invention for providing a reverse data transmission path for interdiction subscribers is generally housed at apparatus housing 56.

Consequently, during a transition period in which headend 10 provides scrambled television programming as well as premium programing in the clear, a scrambler will be provided so long as converter/decoders are provided to subscribers for unscrambling scrambled program transmission. In certain instances, converter/decoders at subscriber locations may be entirely replaced by interdiction apparatus of the present invention. Also, descrambling or decoding equipment may be provided at an off-premises housing.

Also, at the headend, there is normally an addressable data transmitter 14 for transmitting global commands and data downstream to all subscribers or forward addressed communications for reception by a unique subscriber. Such forward data transmission may be conducted over a separate data carrier from the cable television spectrum, for example, at 108.2 megahertz. It may also be transmitted over an unused default channel from the television spectrum. Global commands generally take the form of operation code and data while addressed communications further comprise the unique address of a particular subscriber.

In another alternative embodiment, such communications may take the form of in band signals sent with a television channel superimposed, for example, upon an audio carrier during a special time period, for example, a period corresponding to the vertical blanking interval of the associated video signal. Such data communications further complicate data reception at intervention apparatus and are desirably eliminated. However, in band signaling is sometimes required for the operation of certain converter/decoders known in the art.

Commands then to authorize service to a particular subscriber may be transmitted in-band or on a separate data carrier and typically involve transmitting a unique address of a particular subscriber unit, a command, and data. The decoders receive the command, decode it, determine if the command is to be acted on, and if so perform the desired action such as provide a subscriber with pay-per-view credits or generally authorize services.

Consequently, headend 10, cable television serving cable or trunk line 28, and converter/decoders and television receivers (TV's or VCR's) at a typical subscriber premises comprise a typical known cable television system. Channel program or authorization data is transmitted via an addressable data transmitter 14 over a trunk line 28 to feeder lines with interspersed signal amplifiers 34 and power supply equipment 41,44 provided as required. At a pole 36 or from a pedestal at underground cable locations, the serving signal is dropped via drop 66,88 to a subscriber location.

Drop 66,88 may be connected to a conventional converter/decoder which serves several functions. Responsive to an addressed communication from headend transmitter 14, channel or program authorization data is updated in an authorization memory if the address associated with the addressed communication matches a unique address of the subscriber decoder. For example, the subscriber address may comprise a plurality of bits over and above the actual number of subscribers in a system, additional bits insuring the security of the address. The premium channel or program is then stored in the authorization memory of the converter/decoder. Television programming is normally converted to an otherwise unused channel such as channel 3 or 4 of the television spectrum by a converter portion of converter/decoder. Its premium status is checked against the data stored in authorization memory. If the programming is authorized, the decoder portion of the converter/decoder is enabled to decode authorized scrambled premium programming.

The provided television receiver may be a conventional television receiver or may be a so-called cable ready television receiver. Because of the advent of cable ready television receivers, there is no longer a requirement at a subscriber premises for the converter portion of a converter/decoder because a converter is built into such television receivers.

In accordance with a cable television system provided with interdiction or other off-premises apparatus 56, 60 of FIG. 1, a housing is mounted on a strand 38 supporting the cable to a pole 36, or provided via a pedestal, as is shown more particularly in U.S. Pat. No. 4,963,966. The housing 56,60 may also be mounted indoors in an equipment closet of a multiple dwelling unit or to the side of a subscriber's premises. Inside the housing is common control circuitry for tapping into the broadband television and data transmission spectrum. This circuitry will be more particularly described in connection with FIG. 2. Referring to the pole 36, there is shown a strand-mounted apparatus 56 serving four drops 66 to subscribers. Altogether, four or more subscribers and up to four or more drops 66 may be served by interdiction apparatus 20. Besides the common control circuitry, four or more plug-in subscriber modules may be provided for one off-premises housing. Also, according to the present invention, additional services requiring two way data transmission such as subscriber polling, home shopping, burglar alarm, energy management and pay-per-view services may be provided via four or more special service modules comprising reverse path signal combining circuitry of apparatus 20.

Desirably, all cable television equipment may be removed from the subscriber premises. However, for the provision of certain additional services, some on-premises equipment is unavoidable. In accordance with the present invention, it is assumed that subscriber transaction terminal apparatus simply comprises a subscriber-controlled data transmitter for transmitting data on the subscriber drop 66 in only one direction, namely, to interdiction apparatus 20.

For purposes of this description, the subscriber premises will be assumed to include at least one cable ready conventional television receiver, TV or VCR. Consequently, subscriber equipment need not comprise a tunable converter for converting a received cable television channel to an unused channel such as channel 3 or 4 for reception on such a cable-ready television receiver.

According to the present invention, the subscriber transaction terminal device comprises data entry or sensing means, data confirmation means, i.e. a display or alarm, if required, and a data transmitter coupled between the drop cable and each of these cable ready television receivers.

Power for off-premises apparatus 20 may be provided over the cable from the headend direction via power supplies 41,42 or be provided via the subscriber drop 66 or by a combination of such means. Foreseeably, power may be even provided by rechargeable means such as solar cells or other external or replaceable internal sources such as batteries. Consequently, the subscriber transaction terminal equipment according to the invention described by copending application Ser. No. 625,901 is preferably battery powered.

All off-premises service providing apparatus 20 may be secured in a tamper-resistant housing 56 or otherwise secured as described by U.S. Pat. No. 4,963,966 or secured in a locked equipment closet of an apartment complex. If located in a place exposed to the elements, the housing should be water-tight. Also, the housing should be designed to preclude radio frequency leakage.

Interdiction apparatus 20 is uniquely addressable by headend 10 just as is a known converter/decoder. If two bits of a plural bit unique subscriber address are associated with uniquely identifying one plug-in slot for one of four subscriber modules, common control circuitry may be uniquely addressed with remaining address data not used to secure the data communication. Just as premium programming is transmitted in the clear and since no data communication is necessarily required with a subscriber premises, a subscriber address need not be transmitted in a secure form. Nevertheless, address security may be desirable so long as converter/decoders 150 or other unique address requisite equipment is provided at a premises.

Interdiction apparatus 20 comprises addressable common control circuitry, a plug-in special service module according to the present invention and up to four (or more) plug-in subscriber modules. Upon receipt of subscriber specific premium program, subscriber credit or channel authorization data, the data are stored at memory of common control circuitry of off-premises interdiction apparatus 20.

Interdiction apparatus 20 further comprises a diplexer for providing a forward transmission path which is coupled to automatic gain control circuitry of the common control circuitry, The common control circuitry forwards jamming frequency control data to a subscriber module. Channel interdiction circuitry associated with each subscriber module then selectively jams unauthorized premium programming dropped via a particular drop 66 to a particular subscriber. Consequently, interdiction apparatus 20 is reasonably compatible with downstream addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly timed jamming signal placed at a varying frequency or seek to tamper with the off-premises apparatus 20 or derive a signal from shielded and bonded cables which should likewise be maintained secure from radio frequency leakage. Tamper protection for apparatus housing 56 is described in U.S. Pat. No. 4,963,966 and in application Ser. No. 618,687, entitled "Tamper Resistant Apparatus for a CATV System", filed concurrently herewith.

Two way data transmission is provided via a so-called sub-split frequency spectrum comprising the band 5–30 megahertz for upstream, reverse path transmission toward headend 10 and a spectrum from 54–550 megahertz for downstream forward transmission. In particular, an amplitude shift keyed data transmission signal at approximately 5 MHz is used for communication on drop 66, while a binary phase shift keyed signal is used for upstream data transmission in the T8 band to headend 10. Distribution amplifiers 34 distributed along the distribution plant according to known prior art design techniques separate and separately amplify the two transmission bands. They are distributed along the transmission path in a manner so as to preclude the carrier-to-noise ratio of either transmission path from being too low. Even with such design techniques, the return path is highly susceptible to interference at any point as is described in U.S. Pat. No. 5,045,816 of the same assignee.

Also, at a headend 10, there is located a radio frequency data receiver and data processor for receiving data transmissions from the off- or on-premises subscriber equipment. Details of this equipment are more particularly provided by U.S. Pat. No. 5,155,590.

Figure 2:
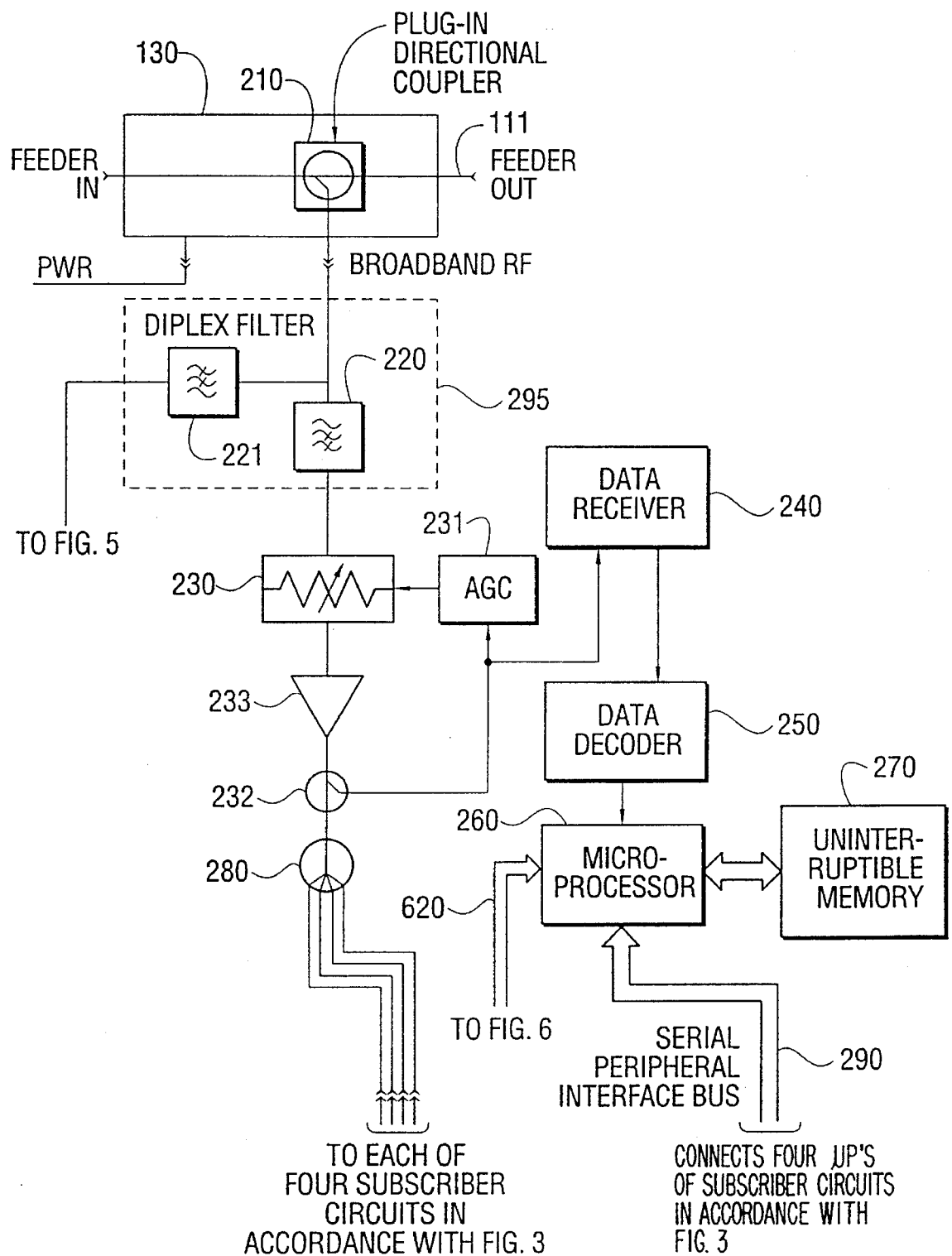
FIG. 2 is a block schematic diagram of an addressable common control circuit for a plurality of provided subscriber modules of an off-premises interdiction system comprising a broadband signal tap, a diplexer connected to the tap, a microprocessor, a data receiver and decoder, and an automatic gain control circuit.

The common control circuitry of interdiction apparatus 20 will now be described by means of the block diagram FIG. 2 for serving four subscriber modules in accordance with the block diagram FIG. 3 and a special service module according to FIG. 6. Referring particularly to FIG. 2, a feeder cable 28 is shown entering off-premises interdiction apparatus 20 at FEEDER IN and leaving at FEEDER OUT. Power PWR may be provided via the feeder cable, by means of the subscriber drop or locally by internal or external means. Depending on the source of power PWR, input power may be of alternating or direct current.

A directional coupler 210 which may be in the form of a plug-in module taps into the broadband serving cable 28. A broadband of radio frequency signals is thus output to highpass filter 220 of diplex filter 295. Highpass filter 220 passes a downstream band of frequencies, for example, 54–550 megahertz comprising at least the cable television spectrum and any separate data carrier frequency, such as 108.2 MHz, and blocks the upstream band of frequencies, for example, 5–30 megahertz (in a bi-directional application). For an off-premises interdiction system, the cable television spectrum may particularly comprise a narrower frequency band from about 54 MHz to 350 MHz.

Lowpass or bandpass filter 221 passes at least the 0–30 MHz spectrum and more particularly a pass band comprising the T8 band from approximately 14–18 MHz. As will be more particularly described herein, one of twenty-three data channels may be selected for upstream data transmission from within the T8 band to avoid noisy regions of the spectrum.

Circuitry associated with broadband signal "seizure" from the distribution cable 28 may be conveniently mounted on a single board, conveniently named a seizure board of apparatus 20, more particularly described in FIG. 15 of U.S. Pat. No. 4,963,966, but described in general terms herein as at least comprising the directional coupler 210 and diplex filter 295 of FIG. 2.

A common automatic gain control circuit as disclosed in FIG. 2 comprises variable attenuator 230, RF amplifier 233, directional coupler 232, and AGC control circuit 231. This automatic gain control circuit appropriately regulates the broadband RF signal power to fall within established limits. The common circuitry of FIG. 2 is collocated or closely located to the subscriber units which will be further described in connection with FIG. 3 and may be contained in the same housing with the special service units for each subscriber which will be described in connection with FIG. 5.

Also connected to directional coupler 232 is a data receiver 240 for receiving downstream forward data transmissions from the addressable data transmitter 14 located at headend 10. Data receiver 240 receives data transmitted, for example, over a data carrier of 108.2 megahertz and provides unprocessed data to data decoder 250. In accordance with an established protocol and as briefly described above, such data may be in the form of an operation code (command), a subscriber unique address and associated data. Data decoder 250 processes the data and provides the separately transmitted data to microprocessor 260 for further interpretation in accordance with a built-in algorithm. Microprocessor 260 is most efficiently chosen to alleviate as many responsibilities from any microprocessor provided for an individual subscriber module and so is most conveniently an eight bit microprocessor having eight kilobytes of internal code such as a Motorola 68HC05C8.

Received data may be stored in uninterruptable memory 270 by microprocessor 260. Data may be stored in memory 270 and jamming frequency control data downloaded when needed to a subscriber module according to FIG. 3 via a serial peripheral interface bus connecting microprocessor 260 with separate microprocessors 300 associated with each provided subscriber module as shown in FIG. 3. Furthermore, microprocessor 260 communicates, for example, upstream frequency and amplitude control data to microprocessors associated with each special service module as shown in FIG. 6 over interface 620 which may comprise the same bus system as serial bus 290. A parallel bus with bus contention among the several modules and processor 260 may be substituted as appropriate for buses 290 and 620.

Variable attenuator 230 regulates the received broadband of picture carriers to the above-described reference level while the microprocessor 260 controls the jamming carrier level outputs of associated subscriber units within the prescribed range. Microprocessor 260 consequently interprets both global communications addressed to common control circuitry or communications addressed to unique subscribers for operation of subscriber modules such as service credit or authorization commands or both. If appropriate, microprocessor 260 ignores global or addressed communications to other interdiction apparatus or to conventional converter/decoders. Examples of global communications peculiar to interdiction apparatus 20 are premium channel frequency data for each premium channel or channel over which premium programming at a particular point in time is provided via headend 10. Examples of addressed communications to common control circuitry include communications comprising premium channel or programming authorization information or communications instructing the common control circuitry to provide credit to a particular subscriber. Examples of commands for operation of special service modules in accordance with FIG. 6 may comprise commands to set transmit level and channel for upstream transmissions in the T8 band.

Figure 4:
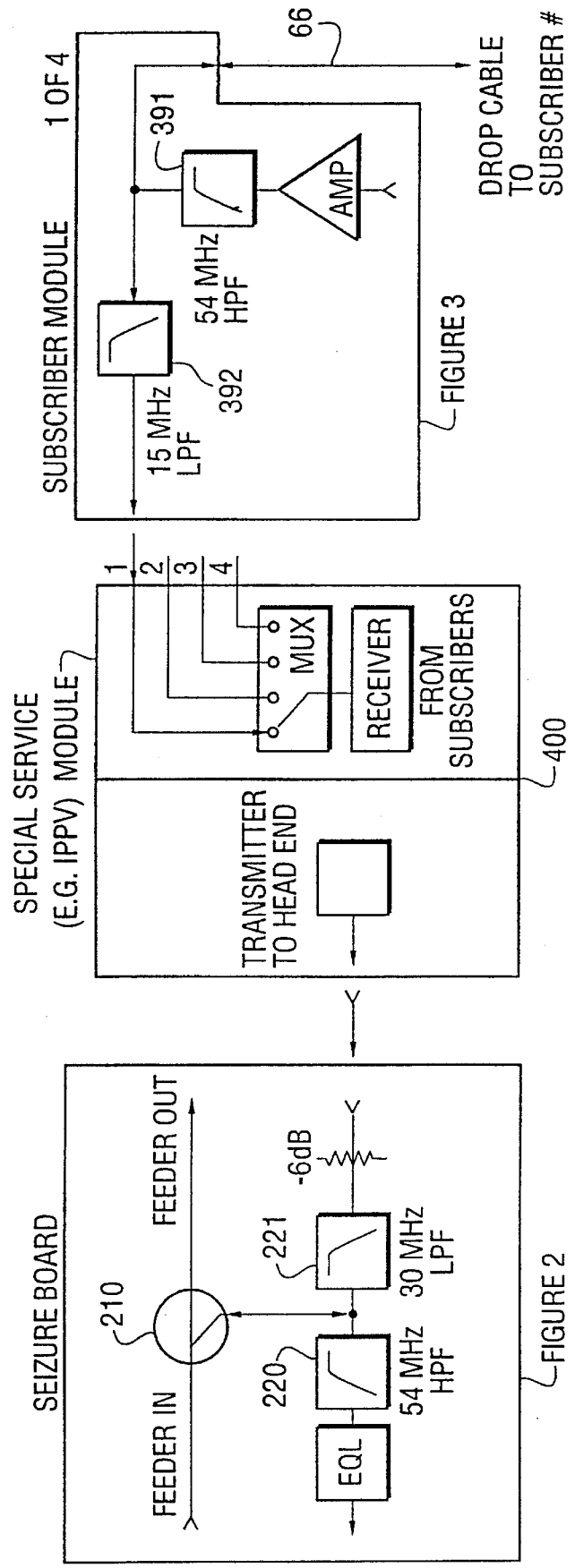
FIG. 4 is a block schematic diagram of the interrelationship between a special services module which will be described in detail in connection with FIG. 6, one of four subscriber modules according to FIG. 3 and the seizure board of common control circuitry of FIG. 2.

If two way services over the serving cable are anticipated, the radio frequency upstream transmissions from on-premises equipment are combined at a multiplexer of reverse path signal combining circuitry according to FIG. 4 for subsequent upstream transmission. A separate data transmitter is provided in the reverse path signal combining apparatus according to FIG. 4 for upstream transmissions to the headend.

Serial peripheral interface buses 290, 620 may be a two way communications link by way of which link microprocessors 300 (FIG. 3) or microprocessors 600 (FIG. 6) associated with subscriber and special service modules respectively, may, at least, provide status reports to microprocessor 260 upon inquiry. Alternatively, a microprocessor of either FIGS. 3 or 6 may tap into a parallel contention-type bus 290 and bid for communication to either a microprocessor 260 of common equipment or another microprocessor 300, 600 or may directly communicate with any of the other associated microprocessors over a separate serial bus 290, 620.

Figure 3:
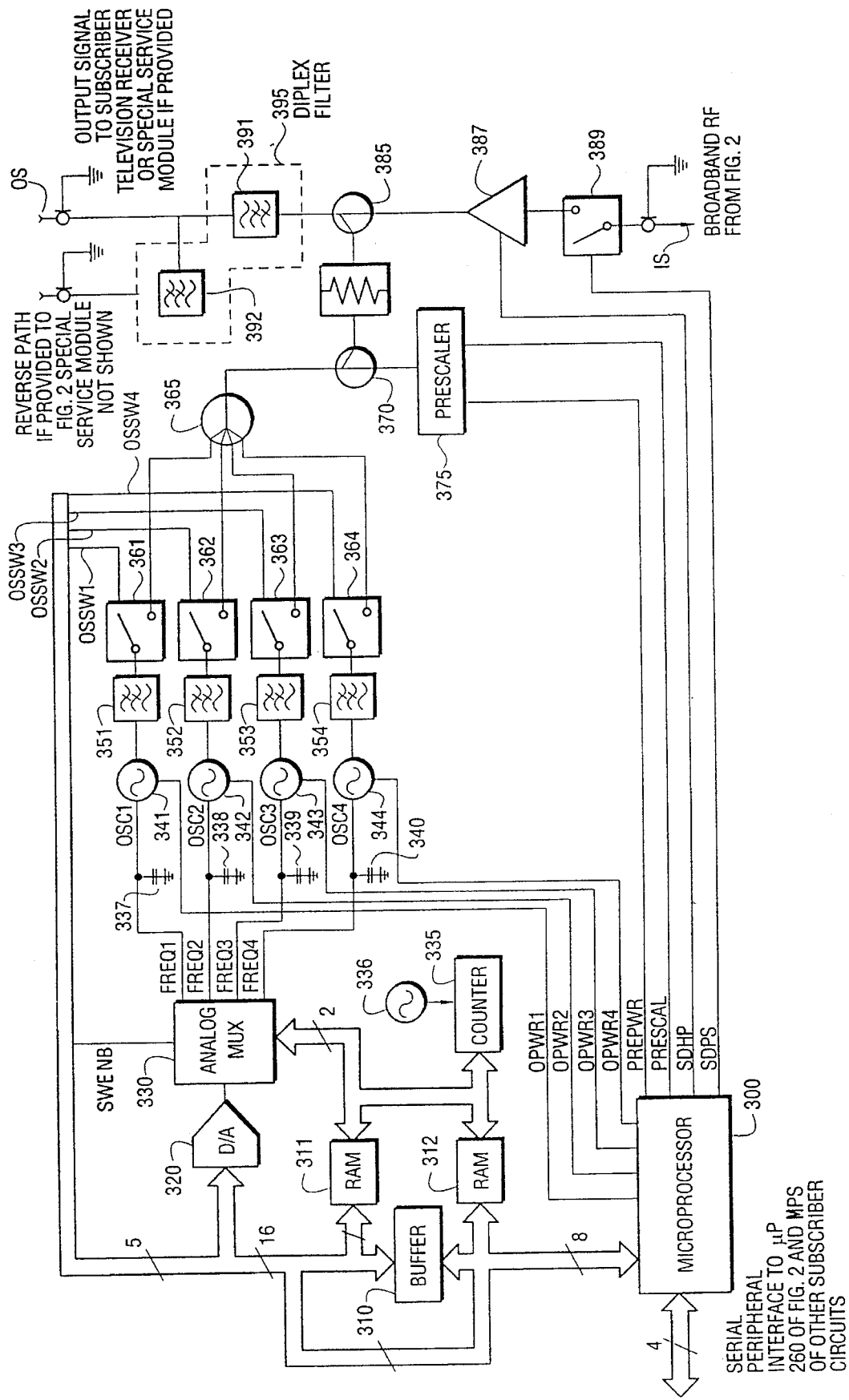
FIG. 3 is a block schematic diagram of one subscriber module of an off-premises interdiction system comprising a microprocessor 300 for selectively controlling the jamming of unauthorized services to a subscriber, associated jamming equipment and a diplexer.

Radio frequency splitter 280 provides broadband radio frequency signals comprising a broadband cable television service spectrum separately to each subscriber module according to FIG. 3 that is provided.

According to the present invention, a reverse path is required to headend 10 or common circuitry according to FIG. 2 for special additional services. Consequently, a signal combiner 400 of a reverse path data transmission module according to FIGS. 4 and 6 is provided for receiving data communications from each of the four subscriber modules in an opposite manner to splitter 280. Certain data may be transmitted back toward the headend via an RF return path according to either FIG. 4 or 6 and a forward transmission path toward the subscriber may be provided in a conventional manner according to FIG. 2 and 3.

Referring more particularly to FIG. 3, there is shown an overall block schematic diagram of a subscriber module of interdiction apparatus 20 including a diplexer 395 in accordance with the present invention. A microprocessor 300 is associated with a particular subscriber module and communicates with microprocessor 260 of FIG. 2 over a serial peripheral interface bus. Microprocessor 300 may comprise an eight bit microprocessor equipped with only two kilobytes of code, this microprocessor being relieved of overall control responsibilities by microprocessor 260. Consequently, microprocessor 300 may conveniently comprise a Motorola 68HC05C3 microprocessor or similar unit.

A reverse path may be provided via a lowpass filter 392 of diplex filter 395 to a special service module (according to FIGS. 4 or 6) collocated with common control circuitry as described in FIG. 2 and subscriber modules according to FIG. 3. Thus, a 5–30 megahertz or other lowpass band, more particularly, a 0–15 MHz lowpass band, may be provided for upstream, reverse transmissions from corresponding subscriber equipment on the subscriber premises. Such a reverse path is completed to the subscriber via terminal OS. Also, power may be transmitted up the subscriber drop to the subscriber module of FIG. 3 and withdrawn at terminal OS.

The broadband radio frequency television spectrum signal from FIG. 2 is provided to terminal IS. Referring to the path connecting terminal IS to terminal OS, there are connected in series a service denying switch 389, a radio frequency amplifier 387, a jamming signal combiner 385, and a high pass filter 391.

Service denying switch 389 is under control of microprocessor 300. In the event of an addressed communication from headend 10 indicating, for example, that a subscriber is to be denied service for non-payment of a bill, service denying switch 389 may be opened. In addition, a high frequency amplifier 387 may be powered down under control of microprocessor 387 whenever service is to be denied. Otherwise, amplifier 387 may be set at discrete gain levels, under microprocessor control, to provide supplemental gain to the broadband television signal if a subscriber has a plurality of television receivers (TV's and VCR's) over and above a nominal amount.

An appropriate control signal waveform output SDPS is provided by microprocessor 300 for controlling switch 389. Also the same on/off control signal that is used to control the switch 389 may control the powering up and down of amplifier 387 as control signal SDHP.

Continuing the discussion of FIG. 3, jamming signals are interdicted at directional combiner 385 under microprocessor control. Because of the directional characteristic of radio frequency amplifier 387, jamming signals cannot inadvertently reach the common control circuitry of FIG. 2 or the serving cable. Highpass filter 391 of diplex filter 395 prevents any return path signals from reaching combiner 385 and passes the broadband spectrum including any jamming signals toward terminal OS. Reverse path signals, for example, in this embodiment may be radio frequency signals below 30 megahertz. The broadband television spectrum is presumed to be in the 50–550 megahertz range. However, interdiction of premium channel viewing may be allocated anywhere desired within a broader or discontinuous cable television spectrum to be jammed. Consequently, filters 391 and 392 are designed in accordance with this or similarly selected design criteria to block or pass broadband television or reverse path signals as required.

Microprocessor 300, responsive to common microprocessor 260, controls the frequency and power level outputs of four (or five if necessary) voltage controlled oscillators 341–344, each of which oscillators jams premium channel frequencies within an allocated continuous range of frequencies. The frequency of the oscillators is set over leads FREQ1–4 in a manner described in U.S. Pat. No. 4,912,760. A power level and on/off operation of the oscillators 341–344 are controlled over leads OPWR1–4.

Since premium programming may be transmitted anywhere in the cable television spectrum, the sum of all such allocated portions comprises the entire television spectrum to be jammed (even where non-premium channels are normally transmitted). Also, in accordance with the depicted interdiction system, the television spectrum to be jammed may comprise discontinuous portions or intentionally overlapping portions.

A further detailed discussion of frequency control and the interdiction system of FIGS. 1, 2, and 3 may be found in U.S. Pat. No. 5,014,309.

Referring now to FIG. 4, there is shown a key figure schematic block diagram of off-premises interdiction apparatus 20 of FIG. 1. One of four subscriber modules according to FIG. 3 is shown omitting all circuit detail for jamming programming. Drop cable 66 from subscriber no. 1 is shown connected to high pass filter 391. Also connected to drop 66 is lowpass filter 392 having a cut-off frequency of 15 MHz for passing an amplitude shift keyed data signal centered at 5 MHz to an associated special service module 400. Lowpass filter 392 and highpass filter 391 together comprise diplexer 395 of FIG. 3.

Special service module 400, shown only in simplified form, comprises a multiplexer for combining signal path inputs from each one of four subscriber modules. A receiver receives the data transmissions from the subscribers, and a transmitter is provided for upstream transmission, preferably in the T8 band.

The seizure board of interdiction apparatus 20 is shown also in simplified form. Directional coupler 210 is shown connected for passing a high passband via highpass filter 220 toward the subscriber while lowpass filter 221 receives the output of the data transmitter of special service module 400 for transmission toward the headend. Lowpass filter 221 and highpass filter 220 together comprise diplexer 295 of FIG. 2.

In a similar manner to diplex filter 295, diplex filter 395 combines the forward and reverse path output and input respectively. A combined signal then is provided toward the subscribers. Thus, diplex filter 295 and diplex filter 395 provide communication paths toward the headend 100 and subscriber respectively. It is a principle of the present invention to provide one diplex filter 295 between directional coupler 210 and common circuitry according to FIG. 2. It is a further principle of the present invention to provide a diplex filter 395 associated with subscriber equipment modules according to FIG. 3. In a plug-in slot of off-premises equipment 20 and coupled to each diplexer is a special service module according to FIGS. 4 and 6.

Figure 5:
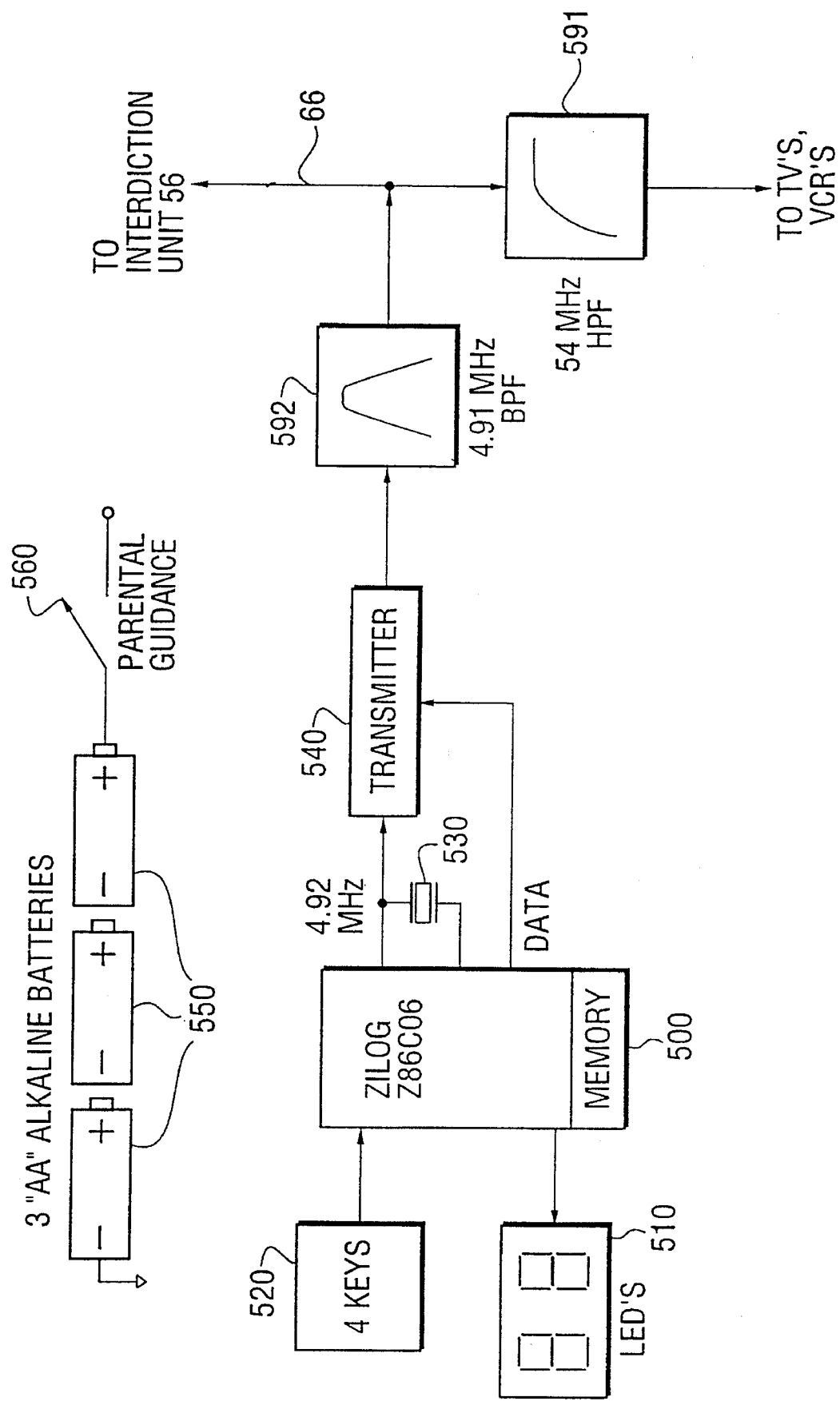
FIG. 5 is a block schematic diagram of on-premises special service transmission equipment according to the present invention, its connection being shown between the drop cable to an off-premises interdiction unit and an on-premises cable-ready television receiver, being also shown in FIG. 3.

Referring now to FIG. 5, there is shown a block schematic diagram of a terminal located on a customer premises which, for the purposes of explaining the present invention, may be called a transaction terminal. Transaction terminal 500 is coupled to a diplex filter 595 between the on-premises television receiver and the interdiction apparatus at drop 66. In an alternative embodiment, the receiver of the special service module 400 and transmitter 540 of FIG. 5 need not comprise a transceiver means coupled to drop 66 but may comprise a radio frequency broadcast transmitter employing over-the-air transmission. Diplex filters 395 and 595 would then not be required. Ultrasonic, infrared or low power remote control radio frequency signal broadcast and reception apparatus could be substituted.

Microprocessor 500 may be a small microprocessor such as a Zilog Z86C06 clocked by clock 530. Microprocessor 500 reads data or data entry or sensor devices 520 which is temporarily stored in processor memory. In a pay-per-view transaction terminal the data entry device comprises a four key keyboard for buying or canceling a particular event. Channel display 510 can scroll through channel or event numbers until the desired event or channel is displayed. The buy key is then depressed indicating a buy of the displayed event. The four keys, then, are up, down, buy and cancel.

In a burglar alarm reporting terminal, the data entry comprises four or more bits of data digitally identifying sixteen portals or windows which may have been breached, while display 510 may be an alarm device.

In a utility meter reading scheme, the sensor inputs may identify the type of meter, electric, gas, or water, and the data may be the reading itself.

Other transaction terminals or a common terminal may be provided for these and other services which come to mind: home shopping, voting, etc.

In any case, the transaction terminal of FIG. 5 further comprises a transmitter 540 for, for example, providing an amplitude shift keyed output data signal, for example, at 9600 baud and comprising opcode and data, i.e. buy channel 88, alarm at portal 12, electric meter at 373 kilowatts. The output data signal is passed through bandpass filter 592 centered at 4.92 MHz toward interdiction apparatus 56. Of course, the signal will be precluded from interfering with television reception by high pass filter 591.

In any transaction terminal, it is desirable if the terminal may be self-powered or utilize a very low degree of power. The apparatus shown in FIG. 5 may be simply powered by three batteries 550 which may be replaced every year or so.

In a pay-per-view transaction terminal, it may be desirable to prevent purchases of programs. Switch 560, may be associated with a key or combination lock. For example, a combination of the four keys of keyboard 520 may unlock switch 560.

A user of the transaction terminal of FIG. 5 purchases a pay per view event in the following manner. The subscriber simply turns the transaction terminal on by actuating any key. The subscriber then scrolls to the channel of event number of the pay per view event desired by pressing a channel up or down key. The subscriber then presses the "buy" key once and then presses the "buy" key again after the display begins to flash.

If the event is at some other time than the present time, the subscriber will not know if he has successfully purchased the event. Since other transaction terminals will be contending for access to the same special service module according to FIG. 4 and 6 and since the subscriber may only cancel a purchase within a predetermined period of time after buying, purchasing and canceling must be assured. To afford this assurance, the buy or cancel message is transmitted by transmitter 540 periodically and at random times as further described by copending application Ser. No. 625,901, filed concurrently herewith. After the transmitter 540 has completed its periodic and random transmissions, for example, occurring over a period of about twenty seconds, the microprocessor 500 may turn itself and its peripheral equipment off to conserve power. Furthermore, no record need be maintained in microprocessor 500 memory. For example, the decision to cancel a buy signal will be made at interdiction apparatus 20, and not at the relatively dumb transaction terminal.

Purchase windows are preset time intervals prior to or at the beginning of a pay per view event program in which a subscriber may purchase an event. Cancel windows are set as an interval of time after an event is purchased during which the purchase of the event may be canceled. Purchase and cancels windows may be set remotely by a transaction from headend 10 to the interdiction apparatus 20.

Figure 6:
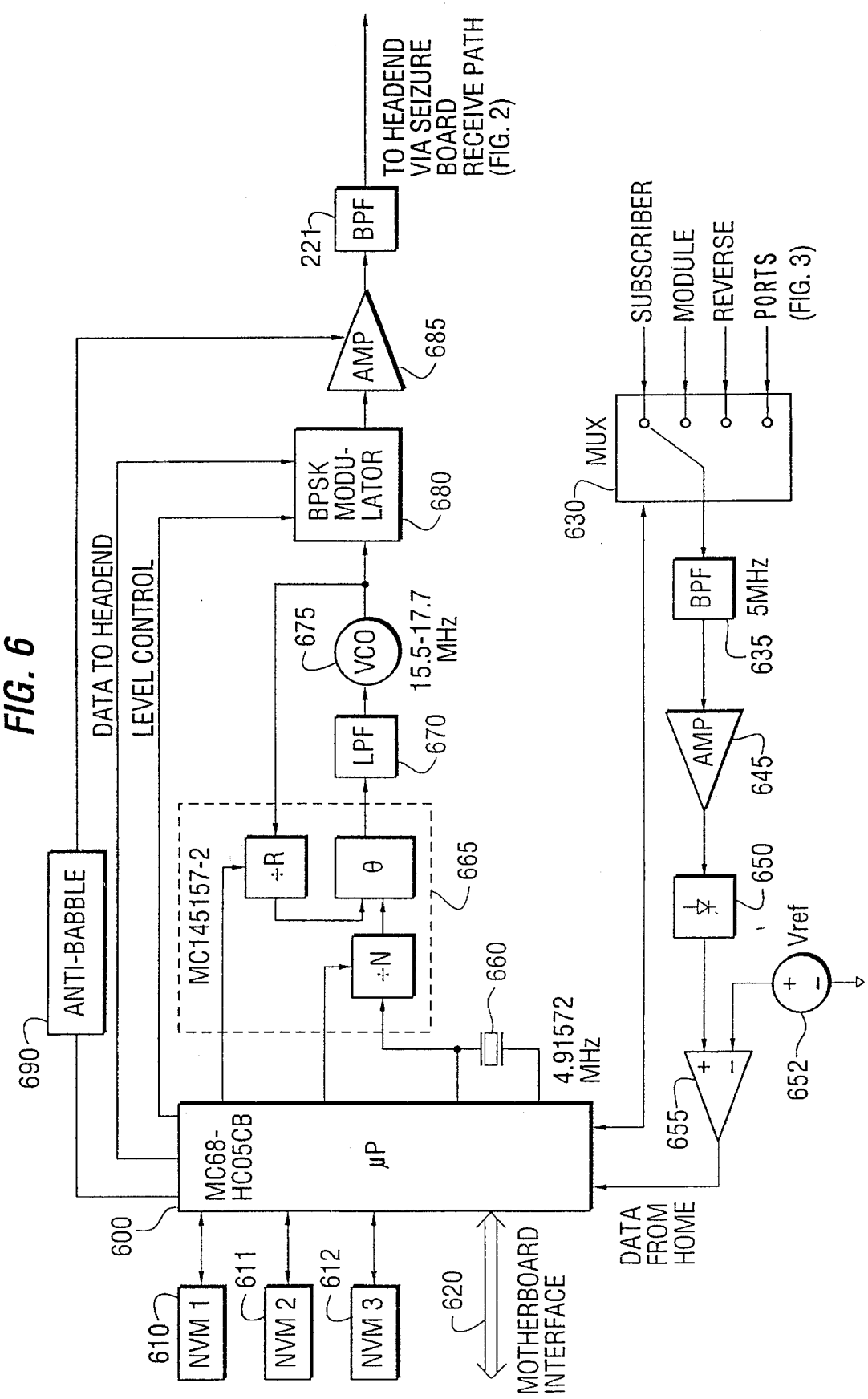
FIG. 6 is a schematic block diagram of a reverse path signal combining system according to the present invention for providing impulse pay-per-view and other special services, in which embodiment a subscriber possessing the transmitter of FIG. 5 may control off-premises equipment comprising the common circuitry of FIG. 2, the special service module of FIG. 6 and the subscriber module according to FIG. 3.

Referring now to FIG. 6, there is shown a block schematic diagram of a special service module (IPPV module) of interdiction apparatus 20 which provides an RF data return path. The special service module of FIG. 6 comprises a signal multiplexer 630, a data receiver 635,645,650,655, a microprocessor 600 which may comprise on-board RAM and a data interface 620 with motherboard processor 260. In this embodiment, there is additionally included an RF data transmitter 680 for upstream data transmission.

The special service module of FIG. 6 is shown coupled between subscriber module equipment according to FIG. 3 including diplexer 395 and diplex filter 295 at the front end of common circuitry according to FIG. 2.

All return data communications for all services are assumed to be provided via the special service module of FIG. 6. Home shopping, subscriber polling, burglar alarm, pay per view and all other services are provided via the depicted circuitry and any associated data are relayed to headend 10 via RF transmitter 680. For example, a meter reading signal from a power company is received via the data receiver 240 of FIG. 2 from headend 10, interpreted by microprocessor 260 and relayed to microprocessor 600. Microprocessor 600 in turn actuates a data transmission to, for example, relay stored data in one of three non-volatile memories 610–612 to headend 10 which had been previously transmitted by meter reading equipment of FIG. 5 on a periodic basis. As an example of a reverse data direction, also consider a burglar alarm which may be activated on the subscriber premises. The alarm may be formatted and modulated for transmission at the subscriber's premises up the drop to the data receiver 655, 650, 652. The message then is interpreted as such by the microprocessor 600 which then controls the RF data transmitter 680 to transmit an appropriate alarm message to the headend.

A subscriber via the terminal of FIG. 5 may control common circuitry or subscriber circuitry as appropriate, for example, an RF power amplifier 387 of a subscriber module according to FIG. 3. In a pay-per-view transaction, the common circuitry is signaled via interface 620 of the buy command. The processor 260 determines the authorization status of the subscriber and then authorizes the channel for the time of the event. When the event is to be displayed, the jamming oscillator for the associated channel is controlled so as to not jam that channel at the time of the paid for event.

Headend 10 periodically transmits a channel, event and time of event data memory map to update random access memory associated with processor 260 over an out-of-band 108.2 MHz carrier signal as described above for transmitting addressed and global communications. Thus, additional non-volatile memory is not required in an out-of-band system for storing event/channel/time tables, such as is an interdiction cable television system. Alternatively, in an in-band cable television system, a channel, event and time table map must be stored in non-volatile memory 270

What is claimed is:

1. Special service apparatus for use in an off-premises cable television system at a location of off-premises subscriber service providing equipment for serving a plurality of subscribers, the apparatus being coupled to a cable distribution plant side and to a subscriber premises side of the service providing equipment respectively by first and second diplexers, the special service apparatus comprising:

a signal combiner for receiving at least one upstream radio frequency data transmission from subscriber premises equipment, said radio frequency data being transmitted in a first predetermined manner, a data receiver for receiving the radio frequency data transmission from the subscriber premises equipment via the signal combiner and for producing a received data signal therefrom, a data processor, coupled to the data receiver, for decoding the received data signal, an interface for enabling data communication between said data processor and a common control circuitry for controlling authorization and provision of service to the subscriber premises equipment, and a data transmitter, responsive to said data processor when said data processor receives a transmit control signal from the common control circuitry, for transmitting transmission data to a headend in a second predetermined manner different from said first predetermined manner.

2. Special service apparatus according to claim 1 further comprising a bandpass filter coupled between the first diplexer and the signal combiner.

3. Special service apparatus according to claim 1 further comprising means for controlling the frequency a operation of the data transmitter.

4. Special service apparatus according to claim 3 wherein the means for controlling the frequency of operation comprises a frequency synthesis circuit coupled to the data processor.

5. Special service apparatus according to claim 1 further comprising means for controlling the signal level output a the data transmitter.

6. Special service apparatus according to claim 1 wherein the data receiver comprises a bandpass filter centered at approximately 5 MHz, a signal detector, and a comparator amplifier for comparing the amplitude of a signal output from said signal detector to a predetermined reference voltage to produce the received data signal.

7. Special service apparatus according to claim 1 wherein the first predetermined manner comprises amplitude shift keyed data at a first predetermined frequency.

8. Special service apparatus according to claim 1 wherein the data transmitter comprises a phase lock loop and a binary phase shift key modulator responsive to the data processor and the phase lock loop.

9. Special service apparatus according to claim 1 wherein the second predetermined manner comprises binary phase shift keying on a channel selected from a plurality of channels in the T8 band.

10. Special service apparatus according to claim 1, the data processor being coupled to memory means for storing data for setting a frequency of operation and an output signal level of the data transmitter.

11. Special service apparatus according to claim 1, wherein the data processor interprets the received data signal, signals the common control circuitry to authorize service, and, responsive to the common control circuitry, controls the data transmitter to transmit transmission data to the headend, the apparatus further comprising memory means for storing data contained in the received data signal and data received from the common control circuitry.

12. A method of controlling off-premises service providing equipment which receives a plurality of channels of service from a headend and provides each of the plurality of channels to on-premises equipment via a drop, at least one of the plurality of channels of service being unauthorized, the method comprising the steps of:

initiating a command at the on-premises equipment, and transmitting the command from the on-premises equipment repetitively over a predetermined period of time at random time intervals to assure reception;

receiving the command for service initiated by a subscriber at a data receiver, verifying that the subscriber has initiated the command, authorizing, if appropriate, an unauthorized channel of service provided by the off-premises service providing equipment to the on-premises equipment at the off-premises service providing equipment in response to the command, and reporting billing information to the headend from the off-premises equipment if the provision of the unauthorized channel of service is authorized.

13. The method of controlling the off-premises service providing equipment according to claim 12 wherein the step of authorizing comprises the step of authorizing a channel of service for a predetermined period of time.

14. The method of controlling the off-premises service providing equipment according to claim 12, further comprising the step of applying jamming signals to each unauthorized channel before providing the at least one unauthorized channel to the on-premises equipment.

15. The method of controlling the off-premises service providing equipment according to claim 14, wherein said step of authorizing comprises authorizing the unauthorized channel of service so that jamming signals are not applied thereto.

16. The method of controlling the off-premises service providing equipment according to claim 15, wherein said step of authorizing the unauthorized channel of service so that jamming signals are not applied thereto comprises authorizing the unauthorized channel of service so that at a predetermined time jamming signals are not applied thereto.

17. A method of controlling off-premises interdiction cable television equipment comprising the steps of:

receiving a command for service initiated by a subscriber at a data receiver, verifying that the subscriber has initiated the command, storing data related to the command at the off-premises interdiction cable television equipment if the command is received during a buy window, authorizing, if appropriate, the provision of service from the off-premises interdiction cable television equipment, providing the authorized service from a headend via the off-premises equipment and reporting billing information, responsive to polling from the headend, from the off-premises equipment to the headend if the service is authorized.

18. The method of controlling off-premises interdiction cable television equipment according to claim 17, wherein said data receiver is selectively coupled to one of a plurality of subscriber inputs, each corresponding to one of a plurality associated with processor 260 because of the relative infrequency and limited capacity of an in-band communications link compared with an out-of-band link from a headend 10 to remote CATV apparatus.

RF data transmitter 680 may transmit data in accordance with well known techniques on any data carrier in the subsplit band, for example, between 5 and 30 megahertz. However, such PSK or FSK data transmissions have been notoriously susceptible to noise interference which has been practically impossible to avoid over time. Once a clear channel is uncovered, the next day, interference from, for example, a previously undetected ham radio operator precludes its use. In a preferred embodiment, and to avoid the noisy transmission path, the return data may be spread over a large portion of the spectrum and so travel secure and hidden in the noise.

A further alternative to spread spectrum, and one which alleviates its high cost, is to provide a plurality of data transmissions over a plurality of data channels spread over the entire return path spectrum comprising, for example, the T8 band. Thus, RF transmitter 680 may be frequency controlled to provide alternatively a number of separate data transmissions over any selected one of a plurality of separate data channels. To this end, frequency synthesizer circuit, for example, an MC145157-2 is provided to control a phase lock loop comprising additionally low pass filter 670 and voltage controlled oscillator 675 to output a particular transmit carrier frequency in the 15.5 to 17.7 MHz T8 band. Each data transmission is complete unto itself. Statistically, at least one such transmission on one channel is assured of reaching the headend 10 on any given day.

Connected between multiplexer 630 and microprocessor 600 are a bandpass filter 635 centered at approximately 5 MHz which may be identical to the bandpass filter 592 of FIG. 5. The data to be passed typically falls within the range of 4.920000 MHz plus or minus 75 KHz with an accuracy of about two per cent. Amplifier 645 amplifies the received signal from the transaction terminal of FIG. 5 just before detection at, for example, diode detector 650. The detected signal is compared at comparator amplifier 655 with a voltage reference provided by reference source 652. The output of comparator 655 is a serial data stream which is input to microprocessor 600.

The received data is interpreted at microprocessor 600 and forwarded via interface 620 to common circuit microprocessor 260 as appropriate. For example, microprocessor 260 is notified of any buy or cancel transaction initiated at a transaction terminal according to FIG. 5.

Data to be transmitted to the headend, for example, billing data responsive to a polling request, is forwarded over a line to BPSK modulator 680, more particularly described in U.S. Pat. No. 5,045,816. In accordance with the invention therein described, the frequency or gain of the BPSK data signal may be controlled from the headend to avoid noisy channels and to assure sufficient signal strength through the system. Frequency control is output to the divide by N and divide by R frequency dividers of frequency synthesis circuit 665. Gain control in a step-wise manner is provided via a level control lead to the BPSK modulator 680.

To prevent "babbling", excessive unwanted data transmissions, anti-babble circuit 690 is provided sensitive to microprocessor 600 and in accordance with U.S. Pat. No. 4,692,919.

Now the operation of the special service module will be described in some detail in regard to authorization of impulse pay per view events. The interdiction apparatus is periodically advised of upcoming events by event number, time and channel from the headend 10 via the addressable in-band or out-of-band system described above. As described above, the data is stored in either non-volatile memory 270 or random access memory as appropriate. The special service module, in turn, is told of the events by the motherboard microprocessor 260 over the motherboard interface 620, preferably a serial peripheral bus link interface. The special service module receives buy and cancel information from the transactions terminal of FIG. 5 in four subscribers' homes, which, in turn, may comprise up to four transaction terminals associated with four television receivers. The multiplexing circuitry 630 is controlled by microprocessor 600 to allow receipt of data from only one subscriber at a time. The microprocessor 600, for example, may scan the subscriber inputs in rapid fashion until data is sensed at one port. The switch then remains stationary at that position until the cessation of receipt of data. One multiplexer circuit which may be used comprises a 74 HCW052 integrated circuit.

The special service module determines if the buy or cancel is valid, and then causes the data, if valid, to be stored in non-volatile memories 610, 611, 612. Up to a certain number, for example, sixteen, thirty-two, or sixty-four, event purchases, including channel, event ID number, and time of purchase are stored in subscriber tables tabulated by subscriber identification or address. Each subscriber's table size may be controlled by the headend up to the maximum size, for example, thirty-two events. Upon polling by the motherboard processor 260, the special service module communicates the information to the motherboard via the motherboard interface 620. The motherboard microprocessor 260 then uses the information to signal the appropriate subscriber module microprocessor 300 to unjam the channel at the predetermined time of the event. The special service module processor also stores the purchase time and event purchased in subscriber purchase memory of non-volatile memory 620. Also, upon polling from headend 10, RF data transmitter 680, responsive to microprocessor 600, forwards billing data, i.e. purchase time and event data per subscriber, to the headend 10.

Messages from the transaction terminal need only comprise an opcode of predetermined length and a channel number. A check byte, i.e. parity, checksum, or error correcting codes may be used as appropriate. The microprocessor 600 identifies the source of the transmission via the position of multiplexer 630.

The motherboard interface transactions, that is between microprocessor 260 and microprocessor 600, are somewhat more complex. For convenience, microprocessor 260 may control or initiate all communications. The communications comprise the following: a status check, an address information message to advise of subscriber addresses, an authorization request to obtain channel authorization information, an authorization poll to obtain the present channel status, a message for controlling headend communication, and an NVM or RAM memory poll or request. In each such communication from the motherboard to the special service module, there is included at least an operation code. In others, there is included a channel number, an address, and/or data, as appropriate. Reply communications from the module to the motherboard microprocessor typically comprise responsive data or signals to the motherboard to request certain data.

of subscribers, for coupling commands for service from the corresponding subscriber to said data receiver, the method further comprising the steps of:

scanning the plurality of subscriber inputs, sensing the command for service at one of said subscriber inputs, and coupling said one subscriber input to said data receiver until the command for service is fully received.

19. The method of controlling off-premises interdiction cable television equipment according to claim 18, wherein said data stored at the off-premises interdiction cable television equipment comprises time of purchase data.

20. A method of controlling the operation of off-premises service providing equipment comprising the steps of:

initiating a command for service at subscriber premises equipment, transmitting the command from the subscriber premises equipment repetitively over a predetermined period of time at random time intervals to assure reception, receiving the command at a data receiver, verifying that the subscriber has initiated the command, authorizing, if appropriate, the provision of service from the off-premises service providing equipment, providing the authorized service from a headend via the off-premises equipment and reporting billing information to the headend from the off-premises equipment if the service is authorized.

* * * * *